Patented Sept. 13, 1938

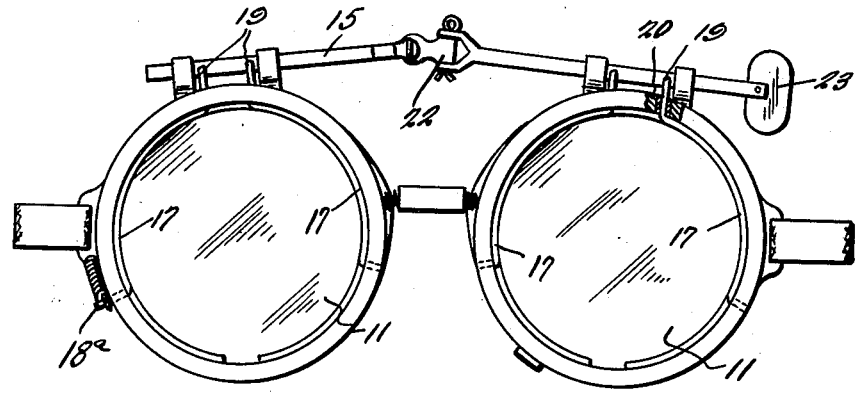
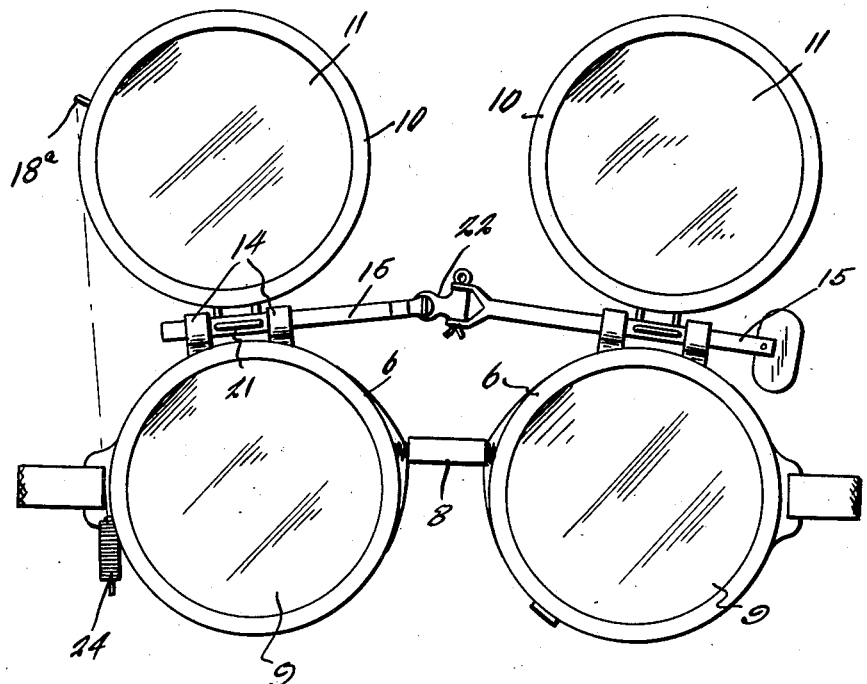

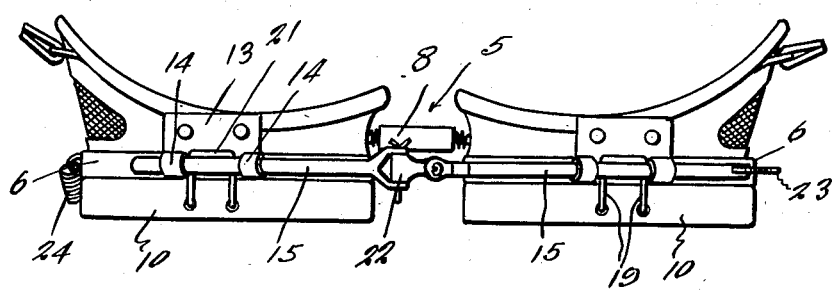
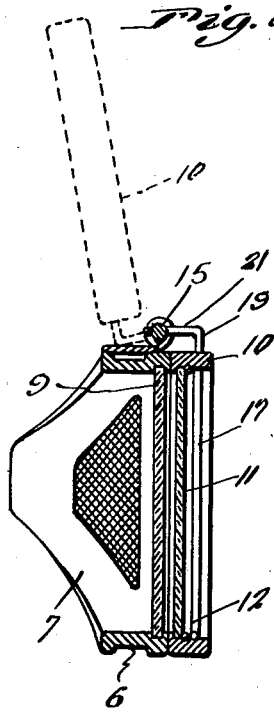
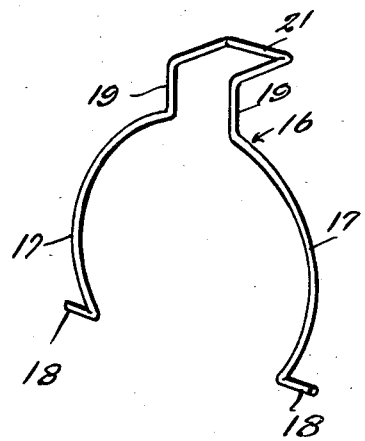

2,130,270

UNITED STATES PATENT OFFICE 2,130,270

GOGGLES

Rosekein G. Dispenza, Ashtabula, Ohio

Application September 18, 1937, Serial No. 164,594

1 Claim. (Cl. 2—14)

This invention relates broadly to goggles and more particularly to goggles for use by workmen.

An object of the present invention is to provide in a single structure goggles which may be worn to protect the eyes against flying chips, or when welding, to protect the eyes from the flame; and the invention together with its objects and advantages will be best understood from a study of the following description taken in connection with the accompanying drawings wherein:

Figure 1 is a front elevational view of the goggles with the part positioned when the goggles are worn for welding purposes.

Figure 2 is a view similar to Figure 1 but showing the parts in position when the goggles are worn for such work the character of which is dangerous to the eyes only because of flying chips.

Figure 3 is a top plan view of the goggles.

Figure 4 is a sectional view through the goggles and

Figure 5 is a perspective view of a wire frame.

Referring to the drawings by reference numerals it will be seen that I provide a more or less conventional pair of goggles indicated generally by the reference numeral 5 and which embodies among other parts lens frames 6 having integral guards 7 and connected by a nose piece 8. Mounted in the frames 6 are lenses 9 of clear glass.

Also in accordance with the present invention there is hingedly mounted on each lens frame 6 a lens frame 10 having mounted therein a lens 11 of colored glass or other opaque or semi-opaque material for use during a welding operation.

The lens 11 is retained within its frame through the medium of a wire-retaining ring 12.

For hingedly associating each lens frame 10 with its lens frame 9 there is mounted on the top of the lens frame 6 a hinge plate 13 provided with hinge eyes 14 in which is journaled a hinge shaft or pin 15.

A frame 16 of wire has arcuate end portions 17 fitting within the frame 10 and at one end the arcuate portions 17 are provided with lateral projections 18 that are seated within suitable recesses or openings provided in opposite portions of the frame 10.

At the end thereof remote from the extensions 18 the arcuate portions 17 of the frame 16 merge into straight parallel portions 19 that extend upwardly through openings 20 provided therefor in the top of frame 10 and as clearly shown in Figure 1. The portions 19 of the frame merge with the legs of an integral U-shaped extension 21 that extends at right angles to the portions 19 of the frame 16, and the legs of the U-shaped extension 21 extend through openings provided therefor in the hinge pin or shaft 17, intermediate the hinge eyes 14.

Thus it will be seen that a rotative movement of a hinge pin 15 will be transmitted to the frame 10 for swinging the frame perpendicularly either to the position shown in Figure 1 for alining frame 10 with frame 6 or to an upward and out-of-the-way position as shown in Figure 2 leaving the frame 6 uncovered.

At one end thereof the hinge shafts or pins 15 are connected together through the medium of a suitable flexible joint 22, which joint will transmit rotative movement of one hinge pin to the other and yet at the same time will permit the hinge pins 15 to assume the necessary angular position relative to one another as required for a proper fit of the goggles to the head of the wearer.

Also one of the hinge pins 15 at its free end is provided with a knob 22 to facilitate the turning of the hinge pin and consequently the swinging of the frames 10, simultaneously, into and out of the positions shown in Figures 1 and 2 respectively.

Also for releasably securing the lens frames 10 in alinement with the lens frames 6 when the goggles are being worn during welding operations, there is provided a keeper spring 24 that at one end is suitably anchored to one of the lens frames 6 and has a free end adapted to engage with the end 18 of a frame 17 and which end of said frame extends outwardly beyond the associated frame 10 as indicated at 18a in Figure 1 whereby the free end of the spring 24 may be engaged with said extension 18a as and for the purpose just stated.

It will be seen that with goggles embodying the features of the present invention when it is not desired to use the lenses 11 the frames 10 thereof may be readily swung upwardly to an out-of-the-way position suggested in Figure 2; and on the other hand, during welding operations or the like, lenses such as lenses 11 are desired the frames 10 thereof may be readily swung downwardly to a position alining with the frames 6 thus providing an efficient pair of welding goggles for the user.

It is thought that a clear understanding of the construction, utility and advantages of a pair of goggles embodying the features of the present invention will be had without a more detailed description.

Having thus described the invention what is claimed as new is:

In a pair of goggles, a lens frame, a hinge plate mounted on said lens frame, a hinge pin journaled in said hinge plate, a second lens frame and means operatively connecting the second-mentioned lens frame to said hinge pin including a hinge member having a U-shaped part the legs of which extends through transverse openings in said hinge pin, arcuate confronting end members fitting within the second-mentioned lens frame and straight parallel portions integrally connecting one end of said arcuate end members with the legs of said U-shaped member.

ROSEKEIN G. DISPENZA.